Aug. 15, 1961   C. A. SAKAITIS ET AL   2,995,825
GAGING DEVICE
Filed Jan. 19, 1956

INVENTORS
Clement A. Sakaitis
BY Otto R. Harping
Edward J. Noe Jr.
atty

United States Patent Office 2,995,825
Patented Aug. 15, 1961

2,995,825
GAGING DEVICE
Clement A. Sakaitis and Otto R. Harping, Dayton, Ohio, assignors, by mesne assignments, to The Sheffield Corporation, a corporation of Delaware
Filed Jan. 19, 1956, Ser. No. 560,216
6 Claims. (Cl. 33—172)

This invention relates to gaging devices and more particularly to a unit for use in gaging systems of the air leakage type.

It is an object of this invention to provide a precision gaging unit for use in gaging systems of the air flow type wherein a plunger controls air flow through a leakage orifice in communication with the system, the unit comprising a few parts, each of simple construction, making possible its economical manufacture to extremely small sizes but for precision operation.

It is a further object to provide a flow control unit for use in gaging systems wherein a controlling plunger is guided for gaging movement by guide means formed as parts of the plunger itself and slidable along simply conformed surfaces provided in the unit housing.

It is a further object to provide such a unit wherein a plunger having an orifice-controlling surface adjacent its inner end is slidably guided for flow control and has an enlarged portion of limited axial extent adjacent its outer end slidable in a passage in the unit housing, the enlarged plunger portion having passage means therethrough for exhaust of air to atmosphere from the unit.

It is a further object to provide a flow control unit for use in gaging systems wherein a slidable plunger has guide means adjacent one end slidable within an orifice forming passage and projecting guide means adjacent its outer end slidable along a passage in the unit housing, passage means being provided for flow past the guides and through the unit.

It is a further object to provide a unit for use in gaging systems wherein a flow controlling plunger is resiliently urged in one direction out of the unit housing and is retained therein by means of a snap ring cooperating between the housing and plunger.

It is a further object to provide a flow control unit for use in gaging systems wherein an orifice forming sleeve is fitted in a cylindrical passage through a body member and a plunger having a surface in controlling relation with one end of the sleeve is supported by spaced guide means forming parts of the plunger itself and slidable within the sleeve and the cylindrical body passage respectively.

Figure 1:
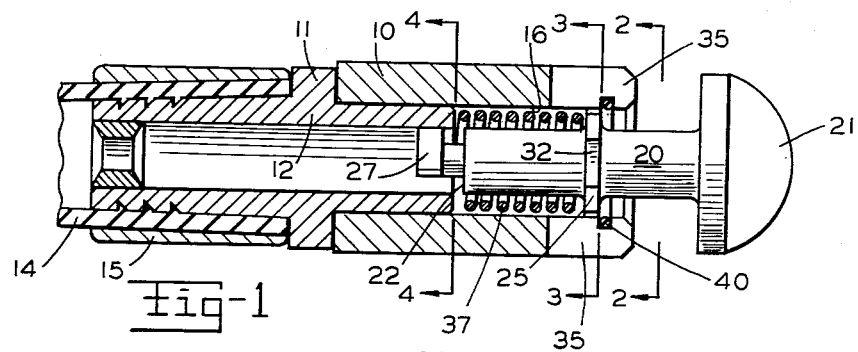
Figures 2, 3, 4:
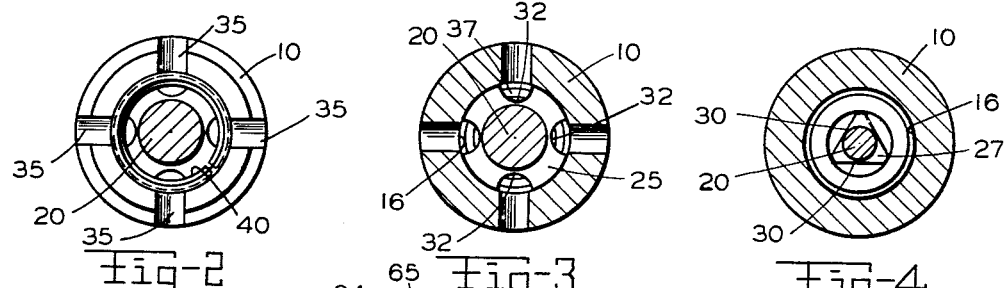
Figure 5:
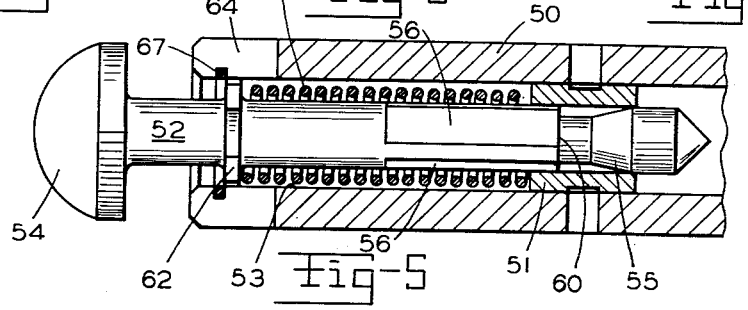
Figures 6, 7:
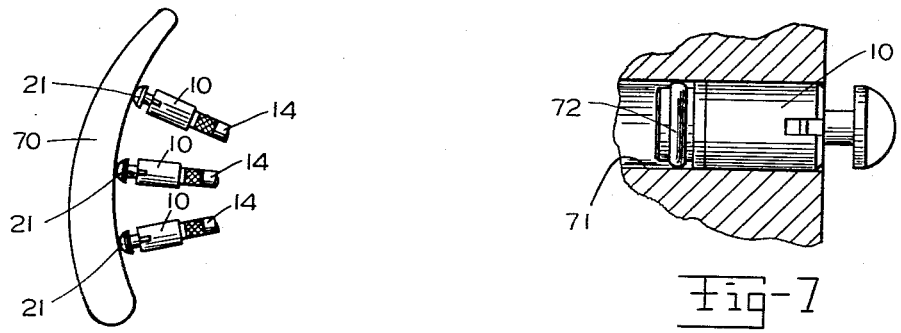

Other objects and advantages of the invention will be apparent from the following description, the appended claims, and the accompanying drawing, in which FIGURE 1 illustrates in longitudinal central section a gaging unit embodying the present invention, FIGURES 2, 3 and 4 are sectional views on lines 2—2, 3—3, and 4—4 of FIGURE 1 respectively, FIGURE 5 is a longitudinal sectional view through a modified form of the apparatus, with one end broken away, FIGURE 6 illustrates an exemplary application of the unit of FIGURE 1, and FIGURE 7 illustrates a modified form of mounting.

The present invention provides a precision gaging unit for connection to gaging systems of the air flow type. It comprises a housing having an orifice outlet in communication with the system and a movable plunger, positioned in accordance with a part dimension, the movement of a machine component, or the like, to control the flow through the orifice. In the unit of this invention the configuration of the actuating plunger and the components of the housing is such as to minimize critical or difficult-to-form surfaces, requiring only a few parts of simple construction, making possible the construction of such units for high precision gaging and of extremely small size.

In the illustrated application of this invention the housing includes an elongated body member having a passage therethrough of uniform cross section. The leakage orifice is provided by a sleeve fitted into the body passage. These components of the housing are extremely simple and economical to manufacture, being formed of basically cylindrical members wherein critical surfaces are provided by through passages of uniform size. The actuating plunger has a part spherical work contactor at its outer end and is carried for sliding movement within the housing to position a flow controlling surface relative to an orifice forming end of the sleeve. The inner end of the plunger is supported by a guide means slidable within the sleeve passage and having portions of reduced radial extent to allow air flow past the guide. The plunger is radially enlarged adjacent its outer end to form a second guide of limited axial extent which engages and slides along the passage through the body member. This enlarged plunger portion also has cut-away sections to allow flow past the guide to atmosphere. The actuating plunger can be manufactured easily and to an extremely small size as necessary because all its surfaces are external and can be formed as by conventional grinding without difficulty.

The plunger is urged outward relative to the housing in the illustrated embodiment by a spring cooperating between one end of the orifice-forming sleeve and the outer, enlarged guide portion of the plunger. A snap ring seated in a groove within the body passage engages the outer plunger guide to limit the outward plunger movement. Threaded sections are completely eliminated, expensive retainers or bushings are avoided, and the unit can be easily assembled and disassembled.

In the illustrated embodiment of FIGURE 1 the housing includes a body member 10 and an insert 11 providing a sleeve 12 with a press fit within the body. The outer end of insert 11 receives a flexible conduit 14 connected to a gaging system and held in place by a sleeve 15. Body member 10 is formed as a simple cylindrical member and its internal passage 16 extends therethrough with a uniform cross-section.

A plunger 20 is carried for sliding movement within passage 16. It has a part spherical work contactor 21 at its outer end for positioning the plunger in a gaging operation and a flow controlling surface 22 adjacent its inner end cooperating with the orifice forming end of sleeve 12 to control flow through the unit in accordance with the plunger position. Work contactor 21 has a transverse dimension substantially equal to the maximum diameter of body member 10. The diameter of surface 22 is such as to allow its movement into the passage of sleeve 12 for overtravel after flow has been effectively stopped.

A guide 25, provided by an enlarged or flange-like portion adjacent the outer end of plunger 20, is slidable along body passage 16. This guide 25 is of limited axial extent. A second guide 27, also of limited axial extent, is provided at the inner end of plunger 20 and is slidable within sleeve 12. Alignment problems between guides 25 and 27 are thus minimized and the flow controlling surface is precisely guided relative to the sleeve passage. Guide 27 has sections of reduced radial extent as indicated at 30 in FIGURE 4 providing passage means to allow flow around the guide and through the passage of sleeve 12. Similarly outer guide 25 has portions 32 of reduced extent spaced about the axis of the plunger (see FIGURE 3). Air which passes between the orifice forming end of sleeve 12 and controlling surface 22 can exhaust to atmosphere through the passage means 32 in guide 25. Slots 35 at the outer end of body member 10 provide further escapage to atmosphere. All surfaces of plunger 20 are external and can be formed as by a simple external grinding operation.

In order to reduce the number of parts and eliminate threaded sections, plunger 20, which is urged outward relative to the housing by spring 37 cooperating between the adjacent end of sleeve 12 and guide 25, is held within the housing by means of a snap ring 40 seated in an annular groove in body member 10. Such snap rings are economical and the unit can be easily assembled and disassembled.

Plunger 20 can be actuated as desired but as illustrated part spherical head 21 is provided for direct engagement with the work. Variations in work dimensions will position surface 22 relative to the outlet or orifice forming end of sleeve 12 and control the flow through the unit in accordance therewith. Such units can be used in systems to actuate indicators, for machine control, part selection and like functions.

Because of its extremely simple construction and the small number of parts involved a unit as provided by this invention can be manufactured to very small dimensions making it possible, for example, to group such units closely for the gaging of closely-spaced dimensions on a work piece. In one commercial example these units are made with a transverse diameter of 7/32 inch with other dimensions in proportion.

The unit of FIGURES 1 to 4 is of a "normal" type wherein flow is reduced with inward movements of plunger 20. FIGURE 5 illustrates a "reverse" type wherein flow is increased with inward plunger movements. The construction of the units is similar. In FIGURE 5 the housing includes a body member 50 having an orifice-forming sleeve 51 pressed into its longitudinal passage 53. Plunger 52 has an enlarged part-spherical work contactor 54 at its outer end and, in this instance, a tapered orifice controlling surface 55 cooperating with the inner end of sleeve 51. Reduced grooves or channels 56 spaced about the axis of plunger 52 are formed in an inner guide portion 60 which slides within sleeve 51. Channels 56 provide passage means to allow flow through the sleeve passage after passing between orifice controlling surface 55 and the inner orifice-forming end of sleeve 51. An outer guide 62 is slidable in passage 53 of body member 50 and includes reduced passage means such as disclosed for the embodiment of FIGURE 1. Slots 64 provide for additional air flow and, as in FIGURE 1, spring 65 cooperates between sleeve 51 and guide 62 and the plunger 52 is retained within the body structure by a snap ring 67. Thus the units can be provided for "normal" or "reverse" flow control. Either radial flow controlling surfaces as indicated at 22 in FIGURE 1 or tapered control surfaces as indicated at 55 in FIGURE 5 can be provided in either embodiment, depending upon the amplification that is desired.

FIGURE 6 discloses an illustrative application of the unit of FIGURE 1 wherein the units are clamped on a support for engagement with the surface of an airfoil 70 to gage its contour. In this instance flexible conduits 14 are connected to an associated gaging system. For example, conduits 14 can each be connected to an indicator comprising a vertically disposed internally tapered flow tube having a float movable thereon in accordance with velocity of flow through the tube and the associated unit.

In FIGURE 7 a modified construction is illustrated wherein the unit body member 10 has a press fit within a passage 71 in a support. An O ring 72 serves to seal the inner end of the unit relative to the passage 71. Where necessary the external surfaces of body member 10 can be threaded and the body screwed into the receiving passage.

Thus it is seen that a gaging unit for use with air leakage type gaging systems has been provided which is extremely simple in construction and assembly and involves only a few parts. Such units can be economically manufactured and to extremely small sizes as desired.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A unit for connection to a gaging system of the air leakage type comprising a body member extending from one end of the unit formed as a substantially hollow cylinder providing a cylindrical passage of uniform diameter extending throughout its length, a sleeve mounted with a press fit in the cylindrical passage, a plunger slidable in the unit having a part spherical work contactor at one end beyond said one end of the unit with a transverse diameter substantially equal to that of the maximum body member diameter and having an annular surface adjacent its other end cooperating with one end of the sleeve for flow control, said plunger having a first portion adjacent said other end guided in said sleeve and a second portion spaced from the first portion and of a larger diameter guided in the cylindrical passage of the body member, spring means cooperating between one end of said sleeve and the second plunger portion, an annular groove within the cylindrical body passage adjacent said one end of the unit, and a snap ring seated in the groove extending into the passage for retaining engagement with the second plunger portion.

2. A unit for connection to a gaging system of the air leakage type comprising a housing having an orifice forming passage therein for communication with the system, one end of the passage forming a leakage orifice, a plunger slidably supported in said body structure having means at one end for moving the plunger in a gaging operation and a surface adjacent its other end in flow controlling relation with said orifice forming passage, guide means cooperating between said housing and said plunger, resilient means acting between the housing and plunger urging the plunger in one direction out of the housing, and a snap ring seated in the housing for engagement with a portion of the slidable plunger to limit its outward movement.

3. A unit for connection to a gaging system of the air leakage type comprising an imperforate body member having a cylindrical passage of uniform cross section, an orifice forming sleeve fitted in said passage, a plunger slidable in said body member having means at one end for moving the plunger in a gaging operation and a surface adjacent its other end in flow controlling relation with one end of said sleeve, guide means for said plunger slidable in said sleeve, further guide means of a larger diameter displaced along the plunger and slidable in the cylindrical body passage, said guide means providing passage means for flow of air, resilient means cooperating between one end of said sleeve and said larger guide means urging the plunger in one direction outward relative to the body member, and a snap ring seated in said cylindrical passage engageable with the larger guide means to limit the outward plunger movement.

4. A unit for connection to a gaging system of the air leakage type comprising a body member extending from one end of the unit formed as a substantially hollow cylinder providing a cylindrical passage of uniform diameter extending throughout its length, a sleeve mounted with a press fit in the cylindrical passage, a plunger slidable in the unit having a work contactor at one end beyond said one end of the unit and having an annular surface adjacent its other end cooperating with one end of the sleeve for flow control, said plunger having a first portion adjacent said other end guided in said sleeve and a second portion spaced from the first portion and of a larger diameter guided in the cylindrical passage of the body member, spring means cooperating between one end of said sleeve and the second plunger portion, an annular groove within the cylindrical body passage adjacent said one end of the unit, and a snap ring seated in the groove extending into the passage for retaining engagement with the second plunger portion.

5. A unit for connection to a gaging system of the air leakage type comprising a body member extending from one end of the unit formed as a substantially hollow cylinder providing a cylindrical passage of uniform diameter extending throughout its length, a sleeve mounted with a press fit in the cylindrical passage, a plunger slidable in the unit having a work contactor at one end beyond said one end of the unit and having an annular surface adjacent its other end cooperating with one end of the sleeve for flow control, said plunger having a first portion adjacent said other end guided in said sleeve and a second portion spaced from the first portion and of a larger diameter guided in the cylindrical passage of the body member, each of said plunger portions having radially reduced outer sections spaced about the axis of the plunger and providing passage means for flow through the cylindrical passage of the unit, means yieldably urging said plunger in the gaging direction during gaging, and retaining means cooperating between said unit and said plunger adjacent the outer end thereof for limiting relative plunger movement.

6. A unit for connection to a gaging system of the air leakage type comprising a body member having a single bore providing a cylindrical passage of uniform cross section entirely through the body member, an orifice forming sleeve fitted in said passage, a plunger slidable in said body member having means at one end projecting beyond the body member for moving the plunger in a gaging operation and a control surface adjacent the other end of the plunger in flow controlling relation with one end of said sleeve, the transverse dimension of said control surface being less than that of the orifice forming passage through the sleeve to the extent of an operating clearance allowing movement of the surface into the orifice passage beyond flow terminating position, said plunger being integrally formed and including first guide means slidably engaging the orifice forming passage of said sleeve and second guide means formed as a radially enlarged integral plunger portion engaging and slidable in the cylindrical body passage, whereby said guide means include externally formed integral plunger surfaces slidably engaging respectively the passage through the orifice forming sleeve and the cylindrical body passage, each of said guiding means having radially reduced outer sections spaced about the axis of the plunger and providing passage means for flow of air through said orifice forming sleeve and exhaust of air from the unit to atmosphere, and retaining means cooperating between said body member and said plunger.

References Cited in the file of this patent
UNITED STATES PATENTS

| | | |
|---|---|---|
| 1,879,197 | Greenwald | Sept. 27, 1932 |
| 2,358,769 | Aller | Sept. 19, 1944 |
| 2,408,672 | Mennesson | Oct. 1, 1946 |
| 2,688,984 | Snyder | Sept. 14, 1954 |
| 2,691,827 | Aller | Oct. 19, 1954 |
| 2,831,257 | Aller | Apr. 22, 1958 |